2,798,100
DIARYLATED KETOSES

Carl B. Linn, Riverside, Ill., assignor to Universal Oil Products Company, Des Plaines, Ill., a corporation of Delaware No Drawing. Application August 12, 1954, Serial No. 449,523

4 Claims. (Cl. 260—618)

This application is a continuation-in-part of my copending application Serial Number 360,838 filed June 10, 1953, as a continuation-in-part of my copending application Serial Number 212,839 filed February 26, 1951, now abandoned.

This invention relates to a new and useful class of compounds formed by reacting a ketose sugar with an aromatic compound to give products wherein each of the aryl groups is bound chemically to the original carbonyl carbon atom of the ketose. Such diarylated derivatives of ketoses are herein referred to as diaryldesoxy ketitols.

An object of this invention is to provide a novel class of compounds in which two aryl hydrocarbon groups are bound chemically to the carbonyl carbon atom of a ketose, the condensation being carried out in the presence of a catalyst. Condensation products of this invention are useful as intermediates in organic synthesis, for example, they are suitable materials for sulfonation to give detergents and wetting agents, for oxidation to organic acids, hydrogenation to naphthenic compounds, as additives to hydrocarbon material to act therein as thickening and gelling agents, as intermediates in the manufacture of pharmaceuticals, explosives, surface coatings, resins, oxidation inhibitors, and the like.

I have found that the condensation of an aromatic hydrocarbon with a carbohydrate derivative containing a keto group and generally referred to as a ketose may be carried out in the presence of hydrogen fluoride at a temperature of from about −20° to about 100° C. and preferably at a temperature of from about −10° to about 50° C. The condensation reaction may be carried out in steel equipment or in other suitable apparatus constructed from silver, copper, and certain alloys such as Monel metal and the like. The pressure at which the reaction is carried out will vary with the reaction temperature employed, the mole fractions of reactants and hydrogen fluoride catalyst present, and the volume of the particular reactor utilized. While the condensation reaction may be carried out at substantially atmospheric pressure, it is sometimes desirable to carry out the process at pressures up to 100 atm. or more. In many instances, it is convenient to operate at the pressure generated by the mixture of reactants and catalyst employed.

While hydrogen fluoride is the catalyst preferred for this process, the invention may also be carried out in the presence of other catalysts including catalysts of the Friedel-Crafts type, particularly aluminum chloride, as such or modified by addition thereto of an alcohol, ether, ester, nitroparaffin, alkyl halide, and the like. Mixtures of boron fluoride and hydrogen fluoride may also be employed. In some cases, fluoro acids are also active in this process, including fluorosulfonic acid, fluorophosphoric acids, hydroxyborofluoric acid and the like.

One embodiment of this invention is a diaryldesoxy ketitol as a new composition of matter.

Another embodiment of this invention is a 4,4-bis(4-methylphenyl)-x,x',x"-cycloalkanetriol.

Still another embodiment of this invention is 4,4-bis-(4-methylphenyl)-1,2,3-cyclohexanetriol.

A further embodiment of this invention is 4,4-bis(3,4-dimethylphenyl)-1,2,3-cyclohexanetriol.

Aromatic hydrocarbons suitable for use in the production of my diaryldesoxy ketitols include benzene, toluene, o-xylene, m-xylene, p-xylene, ethylbenzene, 1,2,3-trimethylbenzene, 1,2,4-trimethylbenzene, 1,3,5-trimethylbenzene or mesitylene, o-ethyltoluene, m-ethyltoluene, p-ethyltoluene, normal propylbenzene, isopropylbenzene or cumene, butylbenzenes, amylbenzenes, and higher molecular weight alkyl aromatic hydrocarbons. Alkyl aromatic hydrocarbons with long chain alkyl groups utilizable in the process may be produced by the alkylation of aromatic hydrocarbons with olefin polymers to yield such materials as hexylbenzenes, hexyltoluenes, nonyl benzenes, nonyl toluenes, dodecylbenzenes, dodecyltoluenes, etc. Often alkylate is obtained as a high boiling fraction in which case the alkyl group attached to the aromatic hydrocarbon may contain from about 6 to about 24 carbon atoms.

Other aromatic hydrocarbons suitable for conversion into diaryldesoxy ketitols include those with two or more aryl groups such as diphenyl, diphenylmethane, triphenylmethane, etc. Also examples of suitable aromatic hydrocarbons which contain condensed benzene rings include naphthalene, anthracene, phenanthrene, also alkylated naphthalenes, alkylated anthracenes and the like.

The ketoses which are also used in the condensation reaction to produce diaryldesoxy ketitols are monosaccharides and according to their chemical nature are hydroxy ketones. According to the number of oxygen atoms present in the molecule of the ketose, they are called trioses, tetroses, pentoses, hexoses, heptoses, and the like. These ketoses have the general formula, $C_nH_{2n}O_n$ in which $n$ generally equals 3 to about 8. Thus these ketoses can all be regarded as polymers of formaldehyde, $(CH_2O)_x$. With exception of the simplest ketose, dihydroxy-acetone, all these monosaccharides have one or more asymmetric carbon atoms and must therefore occur in stereoisomeric form.

The diarylated ketoses or diaryl-desoxy-ketitols may also be prepared from aromatic hydrocarbons and polysaccharides which yield ketose units on hydrolysis. Such polysaccharides include sucrose, inulin, turanose, raffinose, gentianose, melezitose, stachyose, and verbascose.

The simplest ketoses which may be condensed with aromatic hydrocarbons to form my novel diarylated ketoses may be represented by the formula:

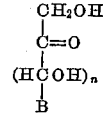

in which $n$ is an integer from 1 to about 8 and B represents hydrogen and $CH_2OH$. As an example of the utility of this general formula, when $n$ equals 1 and B equals hydrogen, the compound is symmetrical dihydroxyacetone; when $n$ equals 1 and B equals $CH_2OH$, the compound is erythrulose; when $n$ equals 2, and B equals $CH_2OH$, the compound is riboketose or xyloketose; when $n$ equals 3, and B equals $CH_2OH$, the compound is psicose, fructose, sorbose, or tagatose; and when $n$ equals 4 and B equals $CH_2OH$, the compounds are heptoses.

The hydrogen fluoride catalyst which is used in this process may be used in anhydrous form or diluted with water to make a hydrofluoric acid of the desired concentration. The hydrofluoric acid may also be diluted further with various inert diluents when it is desired to operate the process with low hydrogen fluoride concentrations. Suitable inert diluents include normal paraffinic hydrocarbons such as propane, n-butane, n-pentane, n-hexane, etc. and perfluoro derivatives of normal paraffinic hydrocarbons such as perfluoro propane, perfluoro normal butane, perfluoro normal pentane, and perfluoro normal hexane. Other suitable diluents in these classes are apparent to one skilled in the art. For example, cycloparaffins, as cyclopentane and cyclohexane, may be used. In some instances, hydrofluoric acid of from about 85 to about 100% HF concentration is desirable, and in some other instances it is more desirable to use substantially anhydrous hydrogen fluoride as the catalyst.

The condensation reaction may be carried out by adding hydrogen fluoride catalyst slowly to a stirred mixture of the hydrocarbon and ketose or reversely the mixture of hydrocarbon and ketose may be added with stirring to the hydrogen fluoride catalyst while maintaining the reaction temperature at from about —20° to about 100° C.

By using suitable cooling and/or heating means, it is often advisable or desirable to commingle the reactants and catalyst at a relatively low temperature such as from about —80° to about —30° C. and then to permit the reaction mixture to warm gradually while the reactants and catalyst are stirred by suitable means such as a motor driven stirrer or other adequate mixing equipment. After the reaction has reached the desired degree of completion, the hydrogen fluoride catalyst is removed from the reaction mixture by distillation at atmospheric pressure or at lower pressure or by passing an inert gas through the reaction mixture while maintaining it at a relatively low temperature. Also, the entire reaction mixture and catalyst may be mixed with water or may be added to ice in order to quench the activity of the hydrogen fluoride catalyst and permit separation of the organic reaction products and unreacted starting materials from the catalyst. The organic reaction products may also be separated from aqueous hydrogen fluoride by means of an organic solvent such as ether in which some of the organic material may be dissolved. Further methods of isolating the reaction products are illustrated in the examples.

EXAMPLE I

This example contains a description of a rather intense study of the reaction of a ketose sugar, namely, fructose with toluene in the presence of hydrogen fluoride. The reaction was studied mainly at 0° C. using contact times of from about 3 to about 66 hours, one reaction being carried out at 30° C.

An outline of the procedure used in reacting d-fructose with toluene in the presence of hydrogen fluoride is as follows: d-fructose and toluene were sealed into a 1-liter turbomixer. After cooling to about —40° C., hydrogen fluoride was added to the turbomixer under pressure from a weighed autoclave and the contactor was stirred for the required time at ice temperature and in one case at 30° C. At the end of the reaction time, a stream of nitrogen was then passed through the reactor for 1 to 3 hours, thus removing most of the hydrogen fluoride. The autoclave was opened and the contents transferred to a silver dish which was later placed in a hood-draft for 18 to 24 hours, after which the hydrogen fluoride still remaining in the product was only about 20 grams. Then the product was washed thoroughly with pentane to remove pentane-soluble components, after which it was separated into a cold water-soluble fraction and a cold water-insoluble fraction. Each of these fractions was then worked up separately to obtain pure compounds therefrom.

*Table I.—Reaction of d-fructose with toluene in the presence of hydrogen fluoride*

| Charge b: | Grams |
|---|---|
| d-Fructose | 50 |
| Toluene | 170 |
| HF | 220 |

| Run No | 21 | 22 | 23 | 24 | 25 | 26 | 27 |
|---|---|---|---|---|---|---|---|
| Conditions of Reaction: | | | | | | | |
| Temp., °C | 0 | 0 | 0 | 0 | 0 | 0 | 30 |
| Contact Time, hrs | 3 | 5 | 16.7 | 20 | 45 | 66 | 3 |
| Recovery, Gms.: | | | | | | | |
| Pentane-Soluble | ---- | 2 | 2 | 1 | ---- | 10 | 24 |
| Water-Soluble | 42 | 50 | 39 | 35 | 15 | 10 | 1.3 |
| Water-Insoluble a | 7 | 15 | 35 | 48 | 84 | 139 | 84 |
| Net Total | 49 | 67 | 76 | 84 | 99 | 159 | 109.3 |
| Toluene Reacted, Gms | 0 | 17 | 26 | 34 | 49 | 91 | 59 |
| Percent of Water-Soluble Material, Also Acetone-Soluble | 44 | 56 | 83 | 97 | 100 | 100 | 50 |
| Acetone-Soluble, Gms | 18 | 28 | 32 | 34 | 15 | 10 | 0.6 |
| Yield of $C_{13}H_{18}O_5$, Gms | 9 | 14 | 20 | 19 | 2 | ---- | 0 |
| Yield of $C_{20}H_{24}O_3$, Gms | ---- | 5 | 11 | 16 | 28 | 46 | ---- | a Exclusive of pentane-soluble.
b In Run 26, the charge was: d-fructose—75 grams; Toluene—215 grams; HF—336 grams.

In the work with fructose at 0° C., it was observed that the reaction was slow. Three hours of contacting at 0° C. resulted in a small amount of reaction product but as the contact time was increased, the amount of toluene reacting increased rapidly. The data given in the table show that the water-soluble portion increased rapidly with time and then fell off, while there was a steady increase in the water-insoluble fraction with time.

An examination of the water-soluble part showed that it contained an acetone-soluble part consisting essentially of a pure compound melting at 123° C., and analyzing clearly for the formula $C_{13}H_{18}O_5$. Chromic acid oxidation of this compound resulted in the production of terephthalic acid. Its structure is, therefore, regarded as:

$$\begin{array}{c} CH_2OH \\ | \\ -C-\!\!\!\!\diagup\!\!\!\!\diagdown\!\!-CH_3 \\ | \\ HOCH \\ | \\ O \quad HCOH \\ | \\ HCOH \\ | \\ -CH \\ H \end{array} \quad (A)$$

2-p-tolyl-2-desoxy-fructose

The water-insoluble portion of the reaction products contained another compound which could be isolated by extraction and crystallization with n-propyl alcohol, by which method it was recovered in quantities amounting to about 30% of the insoluble fraction.

This substance (hereinafter referred to as (B)) melts at 210° C. and is assigned the following structural formula:

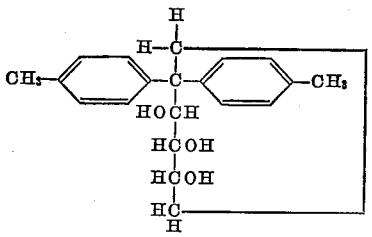

on the basis of the following evidence:

(1) Elementary analysis:

|  | Percent C | Percent H |
|---|---|---|
| Found (B) | 76.53 | 7.68 |
| Calc. for $C_{20}H_{24}O_3$ | 76.89 | 7.74 | shows a molecule containing two tolyl ($C_7$) residues, one fructose residue ($C_6$), and three oxygen atoms.

(2) Chromic acid oxidized (B) to 4,4'-dicarboxybenzophenone. Therefore the structural unit,

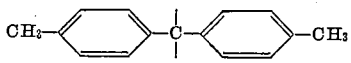

is present.

(3) Forms a tri-acetate. (B) refluxed with acetic anhydride and pyridine gave a crystalline acetate derivative, M. P. 157° C. Elementary analysis:

|  | Percent C | Percent H |
|---|---|---|
| Found, for acetate | 71.28 | 6.88 |
| Calc. for $C_{26}H_{30}O_6$ (triacetate) | 71.21 | 6.90 |

This shows that the three oxygen atoms demanded by (1) above are hydroxyl oxygen atoms.

(4) Contains no olefinic double bond. Stable to alcoholic permanganate. Does not decolorize chloroform colored with bromine.

These data are all in accord with the cited structure and exclude other possible structures except where the saturated carbon ring may be other than a $C_6$ ring, i. e. a $C_4$ or a $C_5$ ring.

All evidence considered, the above constitution is assigned to the diarylated fructose obtained. This is a 4,4-bis(4-methylphenyl)-x,x',x''-cycloalkanetriol, and on the basis of present evidence is considered as 4,4-bis(4-methylphenyl)-1,2,3-cyclohexanetriol.

The diarylated compound obtained from the interaction of toluene and fructose is thus not a homolog in any way of the diarylated compound obtained from the interaction of toluene and glucose, since the latter, as shown in my copending parent applications, has the formula $C_{20}H_{26}O_5$, and possesses five hydroxyl groups.

This compound (B) has a very useful characteristic in that it forms firm gels with benzene and other hydrocarbons. When benzene is heated to the boiling point with about 5% of this compound and then cooled, the solution sets to a stiff gel. It has also been observed to gel pentane, cyclohexane, and other hydrocarbons.

Components of higher complexity than the two pure compounds isolated, occur in amount in the product. Chromic acid oxidation of the water-insoluble part of the product which had been depleted of its content of the pure compound melting at 210° C., gave both terephthalic acid, and 4,4'-dicarboxybenzophenone. This indicates a carbohydrate chain in which one of its carbon atoms is attached to two tolyl groups and an additional carbon atom (or more) attached to a single tolyl group.

Run 26 in Table I employed a higher concentration of reactants than the other runs. A very long contact time (66 hours) was used and this was found to enhance still further the conversion of fructose into the pure compound melting at 210° C. The conversion of 75 grams of fructose gave 46 grams of this compound.

Run 27 in Table I employed 30° C. for the reaction. The course of the reaction here was markedly different. More toluene reacted in three hours at 30° C. than in 45 hours at 0° C. A cursory examination of this product yielded no crystalline compounds. A noteworthy distinction from the product at 0° C. was the large fraction of pentane-soluble product found.

EXAMPLE II 1-sorbose was reacted with toluene in the presence of hydrogen fluoride in a manner similar to that described in Example I. The following reactants were charged to a 1100 milliliter turbomixer autoclave: 50 grams of 1-sorbose, 172 grams of toluene, and 234 grams of HF. The mixture was contacted for 45 hours at 0° C. and atmospheric pressure. Most of the hydrogen fluoride was flushed from the system by passing a stream of nitrogen through the autoclave. The reaction product, when practically free of hydrogen fluoride, weighed 126 grams. From this 126 grams was obtained 82.5 grams of a toluene-free, HF-free product. This product was separated into 7 grams of pentane-soluble material, 14 grams of water-soluble material, and 61.5 grams of water-insoluble product. From the latter 18.5 grams of a pure material melting at 215° C. was obtained. Chromic acid oxidation of a portion of this pure material yielded 4,4'-dicarboxybenzophenone, identified by a methyl ester melting at 222–224° C. Equal parts of the sorbose product melting at 215° C. and the fructose-toluene product melting at 209–210° C. (Example I) gave a mixed melting point of 204–206° C. and the compounds are, therefore, assumed not to be identical. They are, however, stereisomers and differ only in the configuration of their respective three asymmetric carbon atoms. The sorbose-toluene diaryl reaction product is thus assigned the structure:

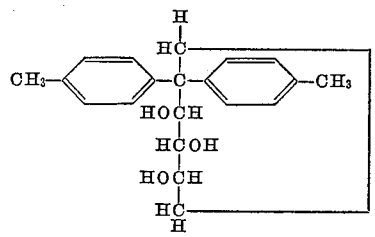

It formed a clear stable gel with benzene when warmed therewith in about 5% by weight amounts.

EXAMPLE III

In view of the information obtained in Example I on the reaction of fructose with toluene in the presence of hydrogen fluoride, an extension of this reaction was conducted by contacting sucrose and molasses with toluene in the presence of hydrogen fluoride. Sucrose is α-D-glucopyranosyl-β-D-fructo-furanoside, which is a non-reducing dihexose. Sucrose, on the basis of previous reactions studied, should hydrolyze and yield a glucose and a fructose residue. These monosaccharides should then react with toluene yielding compounds similar to those already obtained independently from glucose and from fructose. The procedure utilized in this example for the reaction and working up the products is similar to that described previously. A summary of the results obtained is given in the following table:

Table II.—Reaction of sucrose or molasses with toluene in the presence of hydrogen fluoride at 0° C.

| Charge: | Grams |
|---|---|
| Carbohydrate | 50 |
| Toluene | 170 |
| Hydrogen fluoride | 220±15 |

| Carbohydrates Used | Sucrose | | | Molasses | |
|---|---|---|---|---|---|
| Run No | 49 | 50 | 51 | 52 | 53 |
| Contact Time, Hours | 0.5 | 3 | 20 | 20 | 66 |
| Recovery, Grams: | | | | | |
| Water-Soluble at 25° C | 44 | 38 | 20 | 16 | 10 |
| Water-Insoluble at 25° C | 13 | 40 | 68 | 65 | 84 |
| Pentane-Soluble | 1 | 2 | 5 | | 2 |
| Total toluene-free organic | 57 | 78 | 83 | 81 | 94 |
| Toluene Reacted, Grams | 7 | 28 | 33 | 31 | 44 |
| Ratio, mols. toluene/mols. carbohydrate | 0.3 | 1.1 | 1.3 | 1.3 | 1.8 |
| Isolated, Grams: | | | | | |
| (A) | | | (b) | (a) | (a) |
| (B) | | | 8 | 2 | (a) | a Present, but amount not determined.
b Identified in small amounts; yield unknown.

Product (A), which is a compound of a formula $C_{13}H_{18}O_5$, has been described previously in Example I, namely:

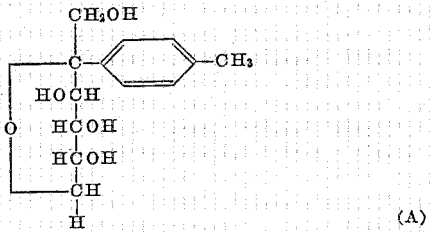

(A)

This product, which has a melting point of 123° C., did not depress the melting point of (A) as isolated in Example I. Chromic acid oxidation again yielded terephthalic acid.

(B) is the di-tolyl compound previously isolated from the fructose-toluene interaction.

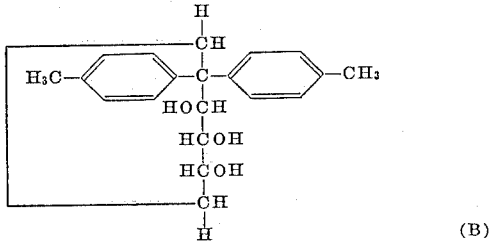

(B)

From the results obtained, it can be seen that sucrose was reacted with toluene at varying contact times. The products showed that the reaction mixture contained the compounds formed from glucose or fructose reacting alone. Compounds (A) and (B) were isolated in yields which indicate that conditions can be found for reacting sucrose to give substantial conversions to them. As was expected from the earlier work on fructose alone, product (B) did not appear in appreciable quantities unless long contacting times were used.

The virtual absence of fructose reaction products at times up to three hours, at which time glucose is completely reacted with toluene, shows that the subject reaction, that is of sucrose with toluene, can be carried out to achieve, in effect, a separation of glucose and fructose units in sucrose by the conversion at short contact times of glucose into arylated derivatives without substantially reacting fructose units.

The molasses used in runs 52 and 53 was a dried, commercial, variety having the following approximate composition: sucrose, 52%; invert sugar, 25%; protein, 4%; ash, 10%; water and nonsugar organic material, 9%. The condensation of molasses with toluene was studied using 20 and 66 hour contacting times. From the former run, small amounts of compounds (A) and (B) were isolated, but from the 66 hour run, no chemical individual was isolated although the recovery of total toluene-free organic product indicated that a very substantial amount of toluene had entered into the reaction.

EXAMPLE IV

In one run, 1.07 moles of dodecylbenzene was contacted with 0.28 mole of d-fructose near 0° C. for 72 hours and in a second run, a like reaction mixture was contacted near 35° C. for 17.75 hours, each run being in the presence of 242 grams of anhydrous hydrogen fluoride. In the run at 0° C., the products obtained consisted of 4 grams of benzene-soluble product, 3.5 grams of acetone-soluble product, and 39 grams of non-volatile pentane-soluble product together with 190 grams of recovered unreacted dodecylbenzene, the latter compared exactly with the charged dodecylbenzene by infrared spectrographic analysis. The non-volatile pentane-soluble product analyzed 81.29% carbon and 10.97% hydrogen and thus corresponded approximately to the analysis calculated from the formula $C_{42}H_{68}O_3$ corresponding to the structural formula of a condensation product formed from two molecular proportions of dodecylbenzene and one molecular proportion of fructose. The non-volatile pentane-soluble product formed a lasting emulsion with water and was extracted from water with pentane, ether, and other solvents with difficulty.

The second run in which 50 grams of fructose and 258 grams of dodecylbenzene were contacted for 17.75 hours at 35° C. in the presence of 242 grams of anhydrous hydrogen fluoride yielded 51 grams of dry, gray-brown powder insoluble in water, slightly soluble in ether, alcohol, benzene, acetone, and methylcellosolve.

Thus the total reaction mixture from the run at 35° C. yielded 160 grams of unreacted dodecylbenzene, 44.5 grams of non-volatile pentane-soluble product and 51 grams of pentane and water-insoluble product, or a total of 95.5 grams of non-volatile product. The 44.5 grams of non-volatile product soluble in pentane and ether obtained from the run at 35° C. had the appearance and solubility characteristics of the similar product formed at 0° C. and found by analysis to have the approximate composition $C_{42}H_{68}O_3$. Mechanical losses were high due to the emulsifying properties of the product and thus made calculations based on product recovery impractical.

EXAMPLE V

Ortho-xylene and fructose were reacted in two experiments carried out at 0° C. and contact times of 3 and 22 hours respectively. The procedure used was similar to that described in previous examples, namely 50 grams of fructose was sealed into a 1-liter turbomixer together with 200 cc. (175 grams) of o-xylene; the autoclave was cooled to about −40° C. and the charge of hydrogen fluoride (218–221 grams) was added. After contacting for the required time at 0° C., the product was worked up as described below, following a period during which nitrogen was passed through the autoclave for two hours in order to remove most of the hydrogen fluoride from the system.

A summary of the experimental results from the two runs is given in the following table:

| Run No | 1 | 2 |
|---|---|---|
| Time of Contacting at 0° C., hours | 22 | 3 |
| Charge, Grams: | | |
| HF | 221 | 218 |
| Fructose | 50 | 50 |
| o-Xylene | 175 | 175 |
| Product, Grams: | | |
| Total xylene free organic | 109 | 71 |
| Water soluble: | | |
| Cold water | 11 | 18 |
| Hot water a | trace | b 23 |
| Pentane soluble | 13 | 3 |
| Cold benzene soluble | 25 | 11 |
| Cold benzene insoluble c | 60 | 16 |
| Mols xylene-mols fructose reacted | 2.0 | 0.7 | a Soluble in boiling water after the cold water part removed.
b More than 40% $C_{14}H_{20}O_5$; M. P. 137° C.
c Essentially pure $C_{22}H_{28}O_3$; M. P. 200° C.

When the autoclave was opened in run 1, the contents was a light pink mush. After standing for one day in the hood draft, the product had blackened slightly. It was transferred to a beaker and macerated with about 1500 cc. of cold water. After filtering, the filtrate was concentrated over a steam bath to dryness to give 14 grams of residue, 50% inorganic in nature. The cold water insoluble product was boiled with about 1200 cc. of water. After filtering hot, the filtrate was concentrated over steam to give 2 grams of inorganic residue. The hot water insoluble product was dried; weight 76 grams. It was extracted four times with pentane using 400 cc. of pentane each time. The pentane soluble part was 10 grams of a reddish yellow heavy syrup. The water-soluble, pentane-insoluble, product was 66 grams, a grey crystalline powder designated (C).

TESTS ON C 1. 10 grams of (C) was put in solution in 150 cc. of boiling n-propyl alcohol. Twenty-four hours later, there were crystals. The solution was cooled in ice water and filtered. The solid product was washed with 75 cc. of cold propanol.

Dry wt_____grams__ 4.2
M. P_____° C__ 190–193

2. Five grams of (C) was dissolved in 180 cc. of boiling formula 30 alcohol. No solid separated in one week.

3. Three grams of (C) was dissolved in 50 cc. of boiling acetone. No solid separated in one day. One week later, the solid separated amounted to 1.1 grams of crystals. M. P. 198–200° C.

4. Thirty-five grams of (C) was treated with 500 cc. of boiling benzene. Considerable was insoluble. The solid separating out of the cooled filtrate was identical to the insoluble segment. Combined they weighed 25 grams and melted at 190–200° C.

5. Four grams of (C) was recrystallized from 100 cc. $H_2O$+500 cc. methanol. Yield 3.4 grams, M. P. 199–202° C.

6. Ten grams of (C) dissolved in 200 cc. of boiling benzene. Upon cooling, 6.0 grams of crystals separated, melting at 200–202° C. This latter product was now soluble with difficulty after long boiling in 600 cc. of benzene. The crystals separating were dried and analyzed. M. P. 109–200° C. Found: percent C, 78.28; percent H, 8.52.

The last product after recrystallization again from benzene showed a melting point of 201–202° C. It was analyzed again:

Found: percent C, 78.22; percent H, 8.66. Calc. for $C_{22}H_{28}O_3$: percent C, 77.61; percent H, 8.29.

The product obtained from run 2 appeared as a two-phase liquid system when the autoclave was opened in contrast to the mushy solid observed in the longer run. After 20 hours, the product (now transferred to a silver dish) was stiff and waxy. It was macerated with four 150 cc. batches of pentane, giving 3 grams of pentane soluble material. The residue stood 40 hours in a hood draft and became 87 grams of a pasty brown grey solid containing a little residual HF. This was transferred to a beaker and macerated with 500 cc. of water at 20° C. and filtered. The filtrate was concentrated dry over steam to wt. 33 grams. The solid was taken up in hot water and a small amount of tar filtered out. The solution was boiled with charcoal, filtered, and concentrated to a dry weight of 30 grams. This was taken up in acetone to separate inorganic salts. After evaporation, the acetone soluble material weighed 17 grams.

The cold water insoluble part above was boiled with 500 cc. of water, filtered, and the insoluble residue washed with 300 cc. of boiling water. The filtrate was concentrated dry to give 22 grams of a white crystalline, solid. This was dissolved in 175 cc. of dry acetone and filtered. No crystals formed after 60 hours at 10° C. The acetone was concentrated to about 25 cc. and a large mass of crystals came out which, after filtering and washing with cold acetone, had a dry weight of 9 grams and melting point of 133–136° C. Only 0.2 gram of this was soluble in 100 cc. of boiling benzene. After filtration, fine crystals came out. M. P. 137–138° C.

*Analysis.*—Found: Percent C, 62.76; percent H, 7.70. Calc. for $C_{14}H_{20}O_5$: percent C, 62.67; percent H, 7.51.

The dry, hot water insoluble product was 25 grams. Ten grams was dissolved in 200 cc. boiling benzene and filtered. After two days the solid separated was 6 grams. M. P. 198–200° C.

From the reaction of o-xylene with fructose, two pure compounds were isolated. The first compound had the empirical formula $C_{14}H_{20}O_5$ and probable structure of:

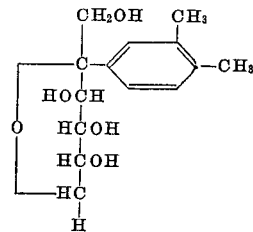

2-xylyl-2-desoxy-fructose

A higher molecular weight product which is insoluble in hot water and in cold benzene analyzed correctly for the formula, $C_{22}H_{28}O_3$. On the basis of evidence similar to that given above in assigning the formula 4,4-bis(4-methylphenyl)-1,2,3-cyclohexanetriol to the ditolylated fructose, (B), the present compound, (D) is called: 4,4-bis(3,4-dimethylphenyl)-1,2,3-cyclohexanetriol.

The monoxylyl desoxy glucitol was obtained mainly from the three-hour run. The other product, namely (D), was found in small amounts in the three-hour run, but was present to the extent of greater than 60 grams of the product in the run carried out for 22 hours. This, considering the charge of only 50 grams of fructose, represented an exceptionally high yield of a pure compound.

I claim as my invention:

1. A diaryldesoxy-ketitol containing a cycloparaffinic ring system and in which the aryl groups are hydrocarbon radicals.

2. A 4,4-bis-(4-methylphenyl)-x,x',x''-cycloalkanetriol.

3. 4,4-bis-(4-methylphenyl)-1,2,3-cyclohexanetriol.

4. 4,4 - bis - (3,4-dimethylphenyl)-1,2,3-cyclohexanetriol.

References Cited in the file of this patent

UNITED STATES PATENTS 2,460,803    Bonner et al. _____ Feb. 8, 1949

OTHER REFERENCES

Ohle et al.: Chem. Abst., vol. 26 (1932), page 1257 (1 page).

Berger: Chem. Abst., vol. 46 (1952), p. 1651 (1 page).